US009302788B2

(12) United States Patent
Wan

(10) Patent No.: US 9,302,788 B2
(45) Date of Patent: Apr. 5, 2016

(54) STRATOSPHERIC-AIRSHIP-ASSISTED ORBITAL PAYLOAD LAUNCHING SYSTEM

(71) Applicant: Li Wan, Nashville, TN (US)

(72) Inventor: Li Wan, Nashville, TN (US)

(73) Assignee: Li Wan, Falls Church, VA (US)

( * ) Notice: Subject to any disclaimer, the term of this patent is extended or adjusted under 35 U.S.C. 154(b) by 190 days.

(21) Appl. No.: 14/282,987

(22) Filed: May 20, 2014

(65) Prior Publication Data
US 2015/0336685 A1  Nov. 26, 2015

(51) Int. Cl.
*B64C 37/02* (2006.01)
*B64G 1/00* (2006.01)
*B64B 1/00* (2006.01)
*B64G 1/40* (2006.01)
*B64G 1/62* (2006.01)
*B64G 1/64* (2006.01)
*B64G 1/52* (2006.01)
*B64B 1/62* (2006.01)

(52) U.S. Cl.
CPC . *B64G 1/005* (2013.01); *B64B 1/00* (2013.01); *B64B 1/62* (2013.01); *B64G 1/00* (2013.01); *B64G 1/40* (2013.01); *B64G 1/401* (2013.01); *B64G 1/52* (2013.01); *B64G 1/62* (2013.01); *B64G 1/64* (2013.01)

(58) Field of Classification Search
CPC .......... B64G 1/00; B64G 1/002; B64G 1/005; B64B 1/00; B64B 1/62; B64C 39/02
USPC .................. 244/2, 158.1–158.5, 158.9, 159.3
See application file for complete search history.

(56) References Cited

U.S. PATENT DOCUMENTS 5,740,985 A * 4/1998 Scott ..................... B64G 1/14
244/137.4
7,131,613 B2 * 11/2006 Kelly ..................... B64B 1/20
244/127

* cited by examiner

*Primary Examiner* — Christopher P Ellis
*Assistant Examiner* — Richard G Davis

(57) ABSTRACT

The present invention is a stratospheric-airship-assisted orbital payload launching system that features with high reusability ratio, low cost, short launch-preparation time and robust reliability. The system consists of an airship-based stratospheric launch platform (1), a stratospheric-launched suborbital shuttle (2, SLSS) and an upper stage (3, a modified version of conventional upper stage or a spaceplane). The airship-based stratospheric launch platform (1) employs hydrogen and helium to provide buoyancy in its ascent and high-altitude cruise stages. Given the substantially lower ambient pressure, the usage of hydrogen at high altitude is much safer than on the ground. The SLSS (2) is mounted beneath the platform (1), and an assembly of payload (4) and upper stage (3) is loaded in the cargo bay (2B) of SLSS (2). In a typical orbital payload launching mission, the airship-based stratospheric launch platform (1) ascends to a predetermined altitude in stratosphere, where the air density is much lower than the sea level and wind is relatively slow and steady comparing with the upper troposhere, and then launches the SLSS (2) in a predetermined position and time. After the SLSS (2) is launched, the platform (1) vents hydrogen lifting gas to swiftly unload the extra buoyancy. Subsequently, the platform (1) descends and returns to its ground base. Meanwhile, the SLSS (2) rockets to a predetermined velocity and altitude (above the atmosphere), opens its cargo bay doors (2D) and releases its cargo (i.e., the assembly of upper stage (3) and payload (4)). The upper stage (3) ignites and propels the payload to a predetermined space orbit. At the same time, the SLSS (2) re-enters, and decelerates via aerobraking. It is finally recovered via a conventional wheel landing.

14 Claims, 7 Drawing Sheets

STRATOSPHERIC-AIRSHIP-ASSISTED ORBITAL PAYLOAD LAUNCHING SYSTEM

FIELD OF THE INVENTION

The present invention relates to systems that used to launch payload into space orbit. It inherits the basic ideas of air launching, takes advantages of the special environment in stratosphere, and is based on technologies and hardware of high-altitude airship and space shuttle. The objective of the present invention is to develop a novel launching system that provides a low-cost, reliable and convenient access into space mostly using existing materials and technologies.

BACKGROUND OF THE INVENTION

Over decades, worldwide space communities have dreamed a new launching system that can be used like car, ship or airplane, providing human beings a low-cost, reliable and convenient access into space. A plethora of concepts therefore have been proposed, technologically and economically scrutinized, blueprinted or even reduced into practical trial. However, to date, the realization of that great dream yet has a long way to go.

Current orbital payload launching systems in service and those that will probably become operational in near future, approximately fall into two categories: The first and the primary category, is using a conventional ground-launched rocket, such as Saturn V, Delta, Atlas, R-7, Proton, Ariane, Long March and H2B; The other category employs a so-called hybrid technology, that is, lifting the launch of a conventional rocket or other kind of vehicle to a predefined altitude via a launch platform, typically an airplane, and then launching that rocket or vehicle.

Today, the usage of conventional ground-launched rocket is wide and sophisticated. However, this method suffers limitations, mainly the high cost per unit payload mass and a large amount of preparation work required prior to each mission, which hurdle the large scale scientific exploration and commercial exploitation in space. Therefore, a series of novel technical routes have been suggested and tried, to overcome these limitations.

Besides the efforts to reuse parts of conventional ground-launched rocket to lower the cost, such as the recently retired space shuttle and the reusable first stage under development by SpaceX, other approaches of launching payload into space orbit have also been proposed, and some even went into practise, for instance, the Pegasus rocket launched by B-52, and more recently, the Stratolaunch founded by Paul G. Allen and Burt Rutan. They all follow the idea that bring the launch of rocket/vehicle to a predefined high altitude, taking advantages of high-altitude launch, and thus lowering time and money expenditure of each mission.

High-altitude launch, or air launching, generally confers advantages over conventional ground lift-off in the following ways:

(i) increases thrust and specific impulse (Isp) of rocket engine: Ambient pressure at high altitude is much lower than the sea level. As such, back-pressure is greatly reduced. Rocket engine thrust and specific impulse both receive a substantial gain. Besides, because the low ambient pressure greatly minimize the overexpansion problem, rocket engine designers thereby own a larger flexibility to chose a larger expansion area ratio and further increase rocket engine thrust and specific impulse;

(ii) reduces steering loss and gravity drag: high altitude launch makes it permissible that the rocket/vehicle flies at a pitch closer to horizontal in initial stage, which grants more flexibilities to trajectory optimization, and hence reducing steering loss and gravity drag. Besides, the rocket/vehicle also owns potential to take advantage of aerodynamic lifting force to counter the gravity.

(iii) reduces the aerodynamic drag and Max-Q: the high altitude launch avoids travelling through the dense portion of atmosphere and thereby reduces the amount of fuel wasted by aerodynamic drag, and minimizes the maximum dynamic pressure;

(iv) allows a lower thrust/weight ratio at ignition;

(v) avoids the destructive acoustical energy that is reflected by ground surface in the conventional lift-off;

However, two high-altitude launch approaches that have been put into practise, launching from an airplane and from a balloon, both unfortunately suffer critical constrains or drawbacks. The approach that launching a rocket/vehicle from an airplane, is greatly constrained by the maximum payload capacity and available volume of its carrier airplane. Launching a mainstream communications satellite or spaceship using this approach is not feasible because there is no operational airplane with the required payload and volume capacity. Meanwhile, the launching-from-balloon approach suffers a critical drawback that the balloon is lack of steerability. As such, the delta-v penalty would be large to compensate positional and azimuth error that brought by balloon. The unpredicted free falling of rocket/vehicle debris additionally raises safety concerns. Moreover, the balloon is not reusable and hence increases the cost. These drawbacks render the balloon launching approach still staying in tentative suborbital usage today, albeit the first launching from balloon took place over half century ago (Rockoon was started in 1950s).

In view of this, while inherit the basic idea of high-altitude launch, the present invention avoids the aforementioned constrains and drawbacks based on recent advances in high-altitude airship and novel features that will be introduced in the following sections.

The complete retirement of space shuttle fleet in 2011 s a huge setback for space community. However, that doesn't weaken the fact that the space shuttle program is thus far one of the greatest achievements in human space exploration and exploitation. The stratospheric-launched suborbital shuttle (SLSS) in the present invention is based on technologies and hardware of space shuttle, and lessons learned in the space shuttle program. Unlike space shuttle that rockets directly into a low earth orbit (LEO), the SLSS releases its cargo at an altitude just above the atmosphere and on a speed lower than the orbital speed, in order to lower the complexity and structural weight required for re-entry, increase the overall payload capacity, and make the SLSS more durable, reliable and much easier to build. Besides, albeit SLSS can be used in manned mission in the future, it is an unmanned vehicle. The weight and complexity of a pressurized cabin and life support system thus can be saved.

Together with an airship-based stratoshperic launch platform, a SLSS and an upper stage (a modified version of conventional upper stage or a newly developed spaceplane), the present invention constructs a novel orbital payload launching system, which has the potential to achieve the lowest cost ever, the highest reusability ratio and reliability, at one stroke.

SUMMARY OF THE INVENTION

According to preferred embodiments of the present invention, the transportation system consists of an airship-based stratoshperic launch platform (1), a SLSS (2) and an upper stage (a modified version of conventional upper stage or a spaceplane) (3). The launch platform (1) is based on technologies of high-altitude airship (HAA). However, it is distinct from conventional HAAs by requiring extremely large payload capacity at high altitude and the ability to swiftly unload extra lifting force after dropping its cargo, whereas the long-endurance requirement for most conventional HAAs is not necessary.

The present invention deals with these requirements via introducing a hybrid structure, employing hydrogen (non-reusable) and helium (reusable) as lifting gas in ascent and cruise stages, venting hydrogen lifting gas completely at high altitude as soon as the SLSS (2) is launched. Albeit hydrogen has lower permeability, higher buoyancy per unit mass, and it is much cheaper than helium and can be used as an excellent high-altitude fuel for propulsion and power systems, hydrogen has been used very limitedly as the balloon/airship lifting gas since the Hindenburg disaster, because of its highly inflammable nature on the ground. Therefore, while employing hydrogen lifting gas in the launching system, the present invention takes the following measures to boost safety.

(a) According to the hydrogen safety standard disclosed by NASA, the lowest pressure for a low-energy ignition source to produce ignition is approximately 6.9 kPa, which is corresponding to 18.5 km in the ARDC model of atmosphere (reported in 1959). In other words, higher altitude and lower pressure grant more safety to hydrogen usage. Hydrogen in ambient won't burn using aforementioned low-energy ignition if the altitude is above 18.5 km according to the ARDC model of atmosphere. As such, engines (1E) and major part of electronic devices on the platform (1) are not working in the initial ascent stage, until the platform (1) reaches a predefined high altitude.

(b) The launch platform use hydrogen as lifting gas only in ascent and high-altitude cruise stage. Soon after the SLSS launched, hydrogen lifting gas is completely vented. The lifting force in platform's (1) descent and return stage is provided by helium. The venting of hydrogen lifting gas also takes place at high altitude and with engines (1E) shut down.

(c) Helium ballonet (1B) is positioned between hydrogen ballonet and electronic devices, engines (1E) and SLSS (2), functioning as a semi-isolation layer.

(d) Fabric structures of the launch platform (1) contains conductive materials, such as aluminum coating or carbon fibre, to prevent and remove static charge.

(e) Inert gas, such as nitrogen, is released, to create an inert environment for hydrogen inflating and fuelling on the ground. The platform (1) also equips with inert gas tank (1NT) and uses inert gas to protect key components and assist removal of hydrogen residue in hydrogen ballonet (1A) after hydrogen lifting gas vented.

According to preferred embodiments of the present invention, the platform (1) includes hydrogen ballonet (1A), helium ballonet (1B) and air ballonet (1C). The hydrogen ballonet (1A) is the largest component of the platform (1), and its shape, if fully extended at high altitude, is an elegant streamline. However, at lift-off, it is partially folded to minimize its cross-section area in ascending by means of releasably fastening its front and tail on the platform frame (1F). As the platform (1) ascends, hydrogen lifting gas expands. Its front and tail are unfastened at a predefined altitude. After the SLSS (2) is launched, hydrogen lifting gas is vented and the hydrogen ballonet (1A) is folded on the helium ballonet (1B) surface. Helium ballonet (1B) is embedded beneath the hydrogen ballonet (1A). There is a composite frame (1F) embedded in its lower portion. Hydrogen-fuelled engines (1E) are mounted on the frame (1F) to propel, steer and power the platform. The helium ballonet is partially inflated at lift-off. The air ballonet (1C) is placed inside of the helium ballonet. In ascent and high-altitude cruise stages, it is left empty. However, it is gradually inflated with air as the platform (1) descends and returns, to keep the helium ballonet (1B) in a streamline shape and assist adjusting the altitude of the platform (1).

One of the key challenges from environment for the launch platform (1) launching its cargo in a predetermined position is wind. According to the wind speed data disclosed by NASA in 2000, the wind at altitude ranging from 20 km to 28 km above KSC and VAFB in winter and spring is relatively slow and steady. Positioning the launch platform (1) within that altitude range greatly reduces the propulsion and steering requirements. Moreover, it is well above the aforementioned 18.5 km safety altitude. As such, it is desirable that the platform (1) cruises and launches the SLSS (2) within that altitude range, and the following hydrogen-venting process is also safe at that altitude.

Given the chilly ambient temperature at high altitude, the preferred embodiments of the present invention employs hydrogen-fuelled engines (1E) to propel, steer and power the platform. Variable centroid control scheme, via moving forward and backward the relative position of service module (1M) and the SLSS (2), is employed to assist adjusting pitch of the platform (1) and balancing the toque generated by the engine (1E) propulsion. In ascent stage, engines (1E) are shut down until the launch platform (1) ascends to a predefined altitude. At lift-off, redundant hydrogen is inflated to provide extra lifting force that speeds up the platform's unpropelled and unsteered ascent. This portion of hydrogen is finally used to fuel engines (1E) when engines (1E) start at a predefined altitude, providing energy to bring the platform (1) to a predetermined launch position and powering the entire launching system.

According to preferred embodiments of the present invention, SLSS (2) could be viewed as a mix of space shuttle and conventional rocket's first stage. It is structurally like a fatted version of Delta IV's first stage, but integrated with wings, landing gears and a large fairing. SLSS (2) probably has higher mass/(bottom profile area) ratio than space shuttle at ignition. The future of SLSS is a single-stage-to-orbit (SSTO) vehicle, and the launch platform (1) in the present invention will definitely facilitate the realization of SSTO, but SSTO is too complex and not economical on current technology level. The present invention thereby has compromised, using a combination of a suborbital shuttle and an upper stage (a modified version of conventional upper stage or a spaceplane) instead. The SLSS (2) in the present invention release its cargo, the assembly of upper stage (3) and payload (4), at an altitude just above the atmosphere (80 km) and on a speed lower than orbital speed.

The SLSS (2) in preferred embodiments of the present invention is mainly powered by cryogenic rocket engine (2E), such as RS-25 (SSME), and burns a combination of liquid oxygen (LOX) and liquid hydrogen (LH2). It releases its cargo, above the atmosphere (80 km), where no fairings are necessary. The SLSS (2) delivers unmanned cargo at the initial stage. Nonetheless, it owns the capacity to deliver a manned vehicle. It can be used to conduct manned mission once it is proven reliable and sophisticated in unmanned missions.

The SLSS (2) has less kinetic energy per unit mass given its lower re-entry speed than space shuttle. Its mass/(bottom profile area) ratio is also lower than space shuttle in re-entry stage, a scenario that is different from the scenario at ignition, because the SLSS (2) has burned its fuel and released the assembly. Therefore, peak temperatures on leading edges of wings and its belly in re-entry are substantially lower than those of space shuttle. The complex and heavy heat shielding system on space shuttle thus could be greatly simplified. It is probable that a combination of titanium alloy and a relatively thin layer of heat isolation is sufficient to withstand the heat. After the re-entry, SLSS (2) is recovered by means of conventional wheel (2T) landing, the same as space shuttle.

According to preferred embodiments of the present invention, the upper stage (3) is either a modified version of conventional upper stage, or a newly developed spaceplane, and is used to propel the payload (4) into a predetermined space orbit. In early preferred embodiments of the present invention, to lower risk and cost of the whole project, the launching system utilizes a modified version of conventional upper stage. In the future, a spaceplane could be developed to replace the modified version of conventional upper stage. The assembly is released above the atmosphere and no extra fairings are necessary. The cargo bay (2B) of SLSS (2) is also able to provide structural support to its cargo. Besides, it is preferable to cross-feed fuel between the SLSS (2) and the upper stage (3).

A typical mission according to preferred embodiments of the present invention is segregated into three distinct flight regimes: the launch platform (1) ascending from ground lift-off pad (5) to a predetermined high-altitude launch position, the SLSS (2) propelling the assembly to a predetermined velocity and altitude, and the upper stage (3) (a modified version of conventional upper stage or a spaceplane) launching the payload (4) into a predetermined space orbit.

Furthermore, it is crucially important to note that payload is more valuable than its launcher in most of launch missions. For some specific missions, so is the launch window (e.g., the launch window for Voyager 2 takes advantage of a 175 year planetary alignment). Therefore, if the reliability of a launching system is greatly compromised, lowering launch cost would be less meaningful.

The combination of the launch platform (1) and the SLSS (2) according to preferred embodiments of the present invention, grants intrinsic reliability to the entire launching system. Briefly, it is that the platform (1) provides altitude redundancy and the SLSS (2) owns payload recovery capacity. If an engine (2E) failure occurs shortly after its launch, the SLSS (2) owns sufficient altitude redundancy, which is provided by the launch platform (1), to safely dump all its fuel and glide to an air-nearby. If there is a serious lifting gas leakage in the launch platform's ascent stage that the mission has to be aborted, the SLSS is launched and rockets at low thrust along a lofted trajectory to consume its fuel, and subsequently glides back to its ground base. In both above-noted scenarios, payload (4), upper stage (3), SLSS (2) and launch platform (1), all can be recovered. The launch could be ready again in hours by using a backup SLSS (2) or launch platform (1), and catch up with the next launch window.

Besides, liquid hydrogen and pressured helium stored in tanks on the launch platform (1) provide large buoyancy reserve that a minor lifting gas leakage won't affect the mission. If the hydrogen ballonet accidentally explodes, the helium ballonet beneath the hydrogen ballonet buffers the destructive shockwave, and hence increase the survival probability of SLSS (2) and its cargo.

The novel features and advantages of the present invention will be more apparent according to the following descriptions of an exemplary preferred embodiment in conjunction with the accompanying drawings.

DETAILED DESCRIPTIONS OF THE DRAWINGS

An exemplary preferred embodiment is provided to better describe the present invention. However, it is important to note that calculation models employed herein are greatly simplified. Specifications of each components in the exemplary preferred embodiment are somewhat arbitrary and without sufficient engineering optimization, albeit they have referenced some operational vehicles. The preferred embodiments of the present invention in practise thus could be very different from the exemplary preferred embodiment. Besides, numerical criteria of the system described herein are predicated on the following platform, SLSS and upper stage specifications (partially shown in the table below). It should be understood that these specifications are neither limiting or exclusive, but merely representative of a possible combination and are stated only as an example.

According to the exemplary preferred embodiment, the launch platform (1) has a total mass of 200 tons (lifting gas is not included). The fabric structures approximately account for 60 percent of total mass. It has a cargo capacity of 200 tons and total volume of 6 million cubic meters at the 22.3 km altitude, where the air density

| Platform | |
|---|---|
| Mass (dry) | 180 ton |
| Mass (full tank) | 200 ton |

-continued

| | |
|---|---|
| Payload | 200 ton |
| Length | 300 m |
| MaxDiameter | 75 m |
| SLSS | |
| Mass (dry) | 30 ton |
| Fuel Mass | 140 ton |
| Payload | 30 ton |
| Bottom Area | 310 m² |
| Front Area | 39 m² | is 5 percent of sea level according to the ARDC model of atmosphere.

The SLSS (2) is rocketed by SSME (RS-25) at 109% full power level. The upper stage is a modified version of Delta cyrogenic second stage. Launching position is above the equator at the altitude of 22.3 km. The launching system is conducting a geostationary transfer orbit (GTO) launch mission. By using a greatly simplified model and the ARDC model of atmosphere, SLSS releases its cargo at velocity of 4.8 km/s and altitude of 110 km. The estimated GTO payload capacity of the launching system is approximately 6 tons (ton using in this document is metric ton).

Figure 1:
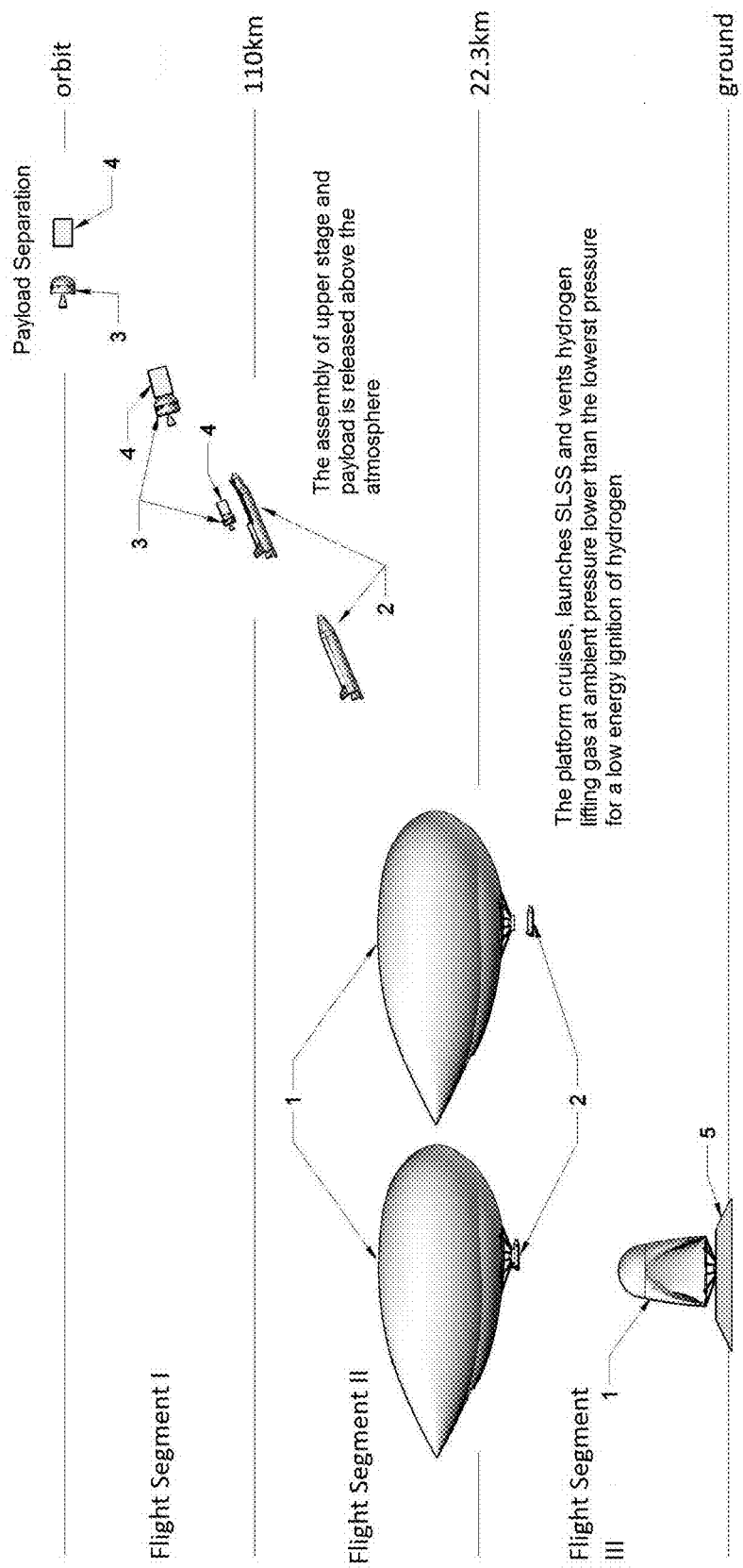
FIG. 1 is a schematic illustration depicting the flight segments of a typical launch mission according to an exemplary preferred embodiment of the present invention (recovery procedures are not included).

FIG. 1 depicts three flight segments in a typical mission. In the first segment, the platform (1) lifts off and ascends using aerostatic buoyancy. At lift-off, engines (1E) of the platform (1) are shut down. As altitude increases, the lifting gas expands. Once the platform (1) reaches a predefined altitude, its engines start, propelling the platform to a predetermined position, adjusting its aizmuth and pitch, and powering the entire launching system. As the launch window time arrives, the platform launches the SLSS (2).

In the second flight segment, main engine (2E) of SLSS (2) ignites and rocket the SLSS (2) along a predetermined trajectory. Once the SLSS reaches a predetermined velocity and position, which is above the atmosphere (80 km), the main engine (2E) is shut down. Doors (2D) of cargo bay (2B) are opened and the assembly of upper stage (3) and payload (4) is released.

In the third flight segment, the upper stage (3) ignites and launches the payload (4) into a predetermined space orbit. In the exemplary preferred embodiment of the present invention, the upper stage (3) is finally burned out in atmosphere after the mission finished. It is the only hardware that is not reusable in the whole transportation system and it accounts for a small portion of the entire system. Preferred embodiments in the future would develop a reusable upper stage or a spaceplane to further increase the reusability ratio and lower the cost.

Figure 2:
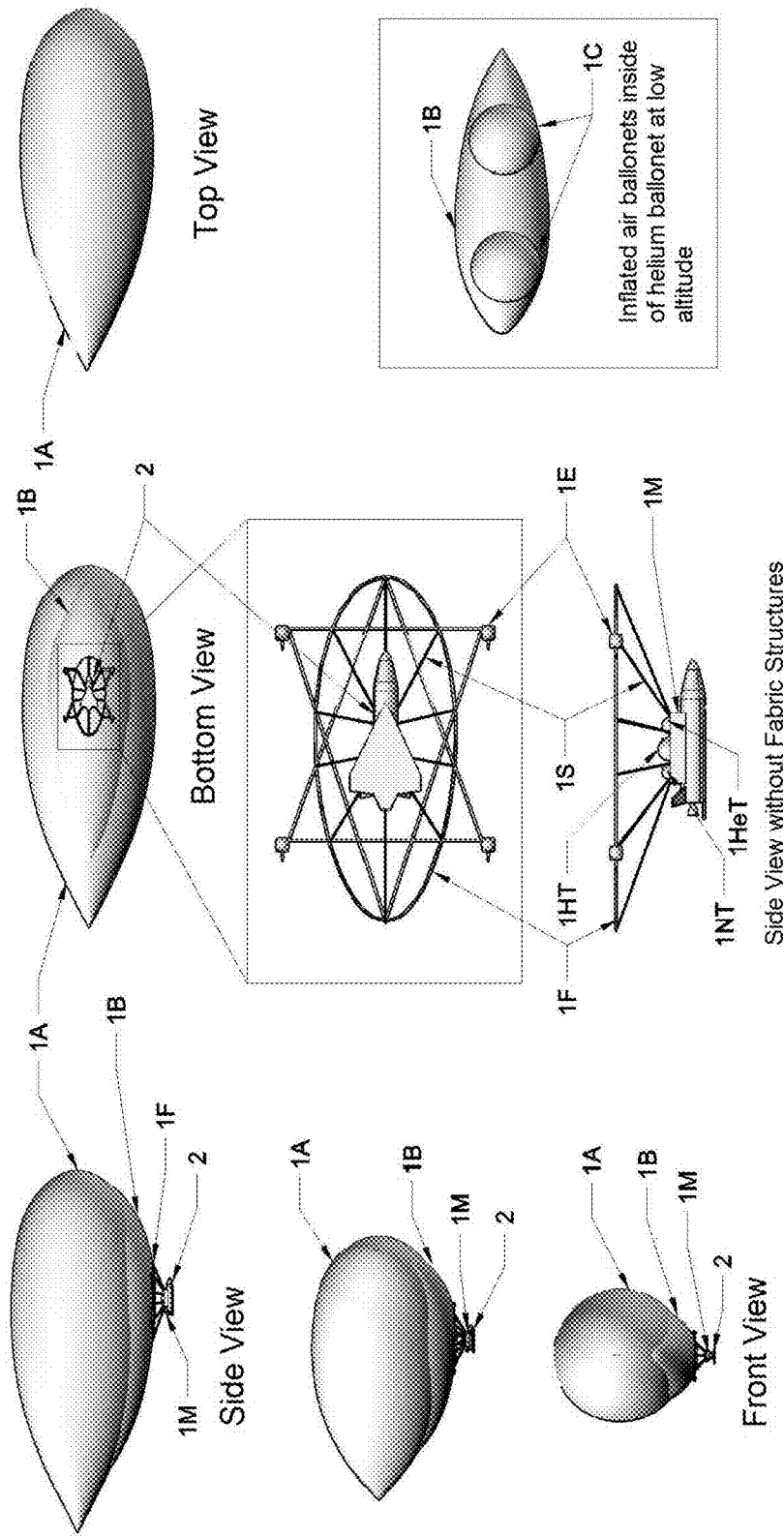
FIG. 2 is a pictorial representation of the platform's basic structure and major components in accordance with an exemplary preferred embodiment of the present invention, including views from various sides at high altitude, and a inset profile (left bottom) which schematically shows the relative position of inflated air ballonet at low altitude.

FIG. 2 pictorially illustrates the basic structure and major components of the launch platform (1) in accordance with the exemplary preferred embodiment. The platform primarily consists of a hydrogen ballonet (1A), a helium ballonet (1B), air ballonet (1C), composite frame (1F), engines (1E), a suspension system (1S) and a service module (1M). As shown in FIG. 2, the hydrogen ballonet (1A) is the largest component of the platform (1) at high altitude. The helium ballonet (1B) is embedded beneath the hydrogen ballonet (1A), while the composite frame is embedded inside of the lower portion of helium ballonet (1B). Hydrogen-fuelled engines (1E) are mounted on the frame. The service module (1M), which equipped with liquid hydrogen tank (1HT), liquid nitrogen tank (1NT) and pressured helium tank (1HeT), is hanged below the helium ballonet (1B) via a suspension system (1S). Liquid hydrogen in the tank (1HT) is used to compensate the liquid hydrogen loss in SLSS liquid hydrogen tank. Vaporized Hydrogen is harvested to compensate the lifting gas loss in the hydrogen ballonet (1A), or fuel engines (1E). The SLSS (2) is releasably mounted below the service module (1M). The air ballonet (1C) is placed inside of the helium ballonet (1B). It is left empty in ascent and high-altitude cruise stages and gradually inflated in descent stage.

Figure 3:
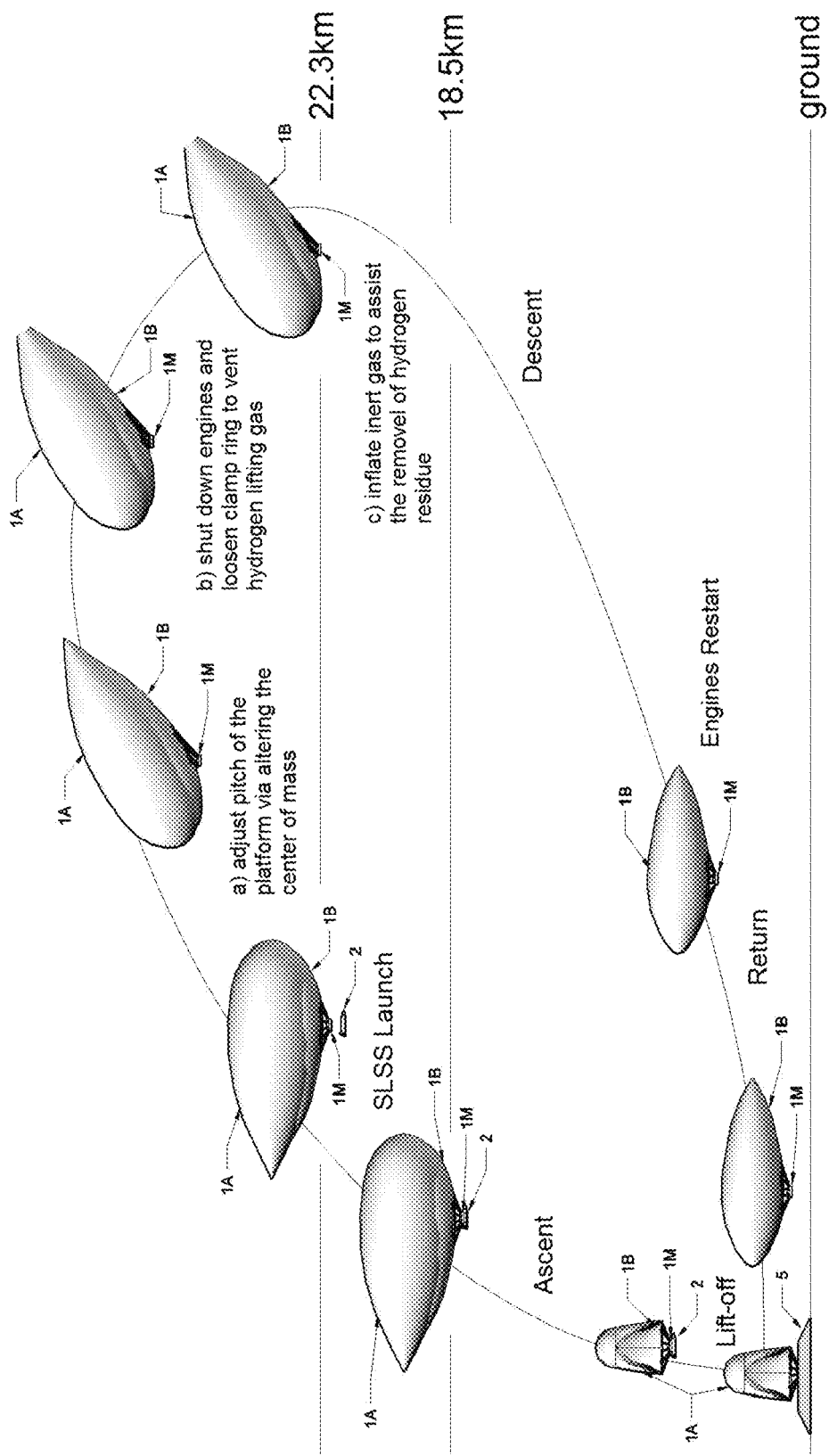
FIG. 3 is a schematic illustration depicting all major steps that the platform follows in a typical launch mission, including its recovery, according to an exemplary preferred embodiment of the present invention.

All major steps that the platform (1) follows in a launch mission is pictorially shown in FIG. 3. In the countdown hours before lift-off, an inert environment is created by releasing nitrogen gas. Hydrogen lifting gas is inflated into the hydrogen ballonet (1A) from its tail. The tail of the hydrogen ballonet (1A) is tightly clamped after hydrogen inflation finished. Both head and tail of the hydrogen ballonet (1A) are releasably fastened on the frame (1F) at lift-off, and unfastened when the platform (1) reached a predetermined altitude. Redundant hydrogen is inflated to provide extra buoyancy that can speed up the ascent. As the platform (1) reaches a predefined safety altitude, engines (1E) start, burning the above-noted redundant hydrogen to bring the platform to a predetermined launch position and azimuth. Vaporized hydrogen in SLSS's LH2 tank (2LH2T) and in platform's LH2 tank (1HT) is also harvested to fuel engines (1E). As the launch time arrives, the SLSS is launched.

After the launch of SLSS (2), the platform (1) quickly ascends because of large extra buoyancy. The platform (1) swiftly adjusts its azimuth and pitch via engine (1E) thrust and altering the relative position of service module (i.e., variable centroid control scheme). Subsequently, engines (1E) and some electronic devices are shut down, and the clamp ring on the tail of the hydrogen ballonet (1A) is loosened to vent hydrogen lifting gas, unloading the large extra buoyancy. In the final stage of hydrogen venting, the platform (1) starts to descend because its buoyancy is getting smaller than its weight. Finally, nitrogen gas from the nitrogen tank (1NT) is inflated into the hydrogen ballonet (1A) to assist the removal of hydrogen residue. Meanwhile, the hydrogen ballonet (1A) is gradually folded and fastened on the helium ballonet (1B).

In the platform's (1) descent stage, helium is gradually inflated from the helium tank (1HeT) into the helium ballonet (1B), in order to rebalance the platform's (1) buoyancy and weight, and air is inflated into the air ballonet (1C) to keep the platform in a streamlining shape. Engines (1E) restart to bring the platform (1) back to its original launch pad (5).

Susequently, the platform (1) is fastened on the launch pad. Air in the air ballonet is completely vented. A portion of helium in the helium ballonet (1B) is pressured into the helium tank (1HeT). After routine checks and maintenance, the platform (1) is ready for the next mission.

Figure 4:
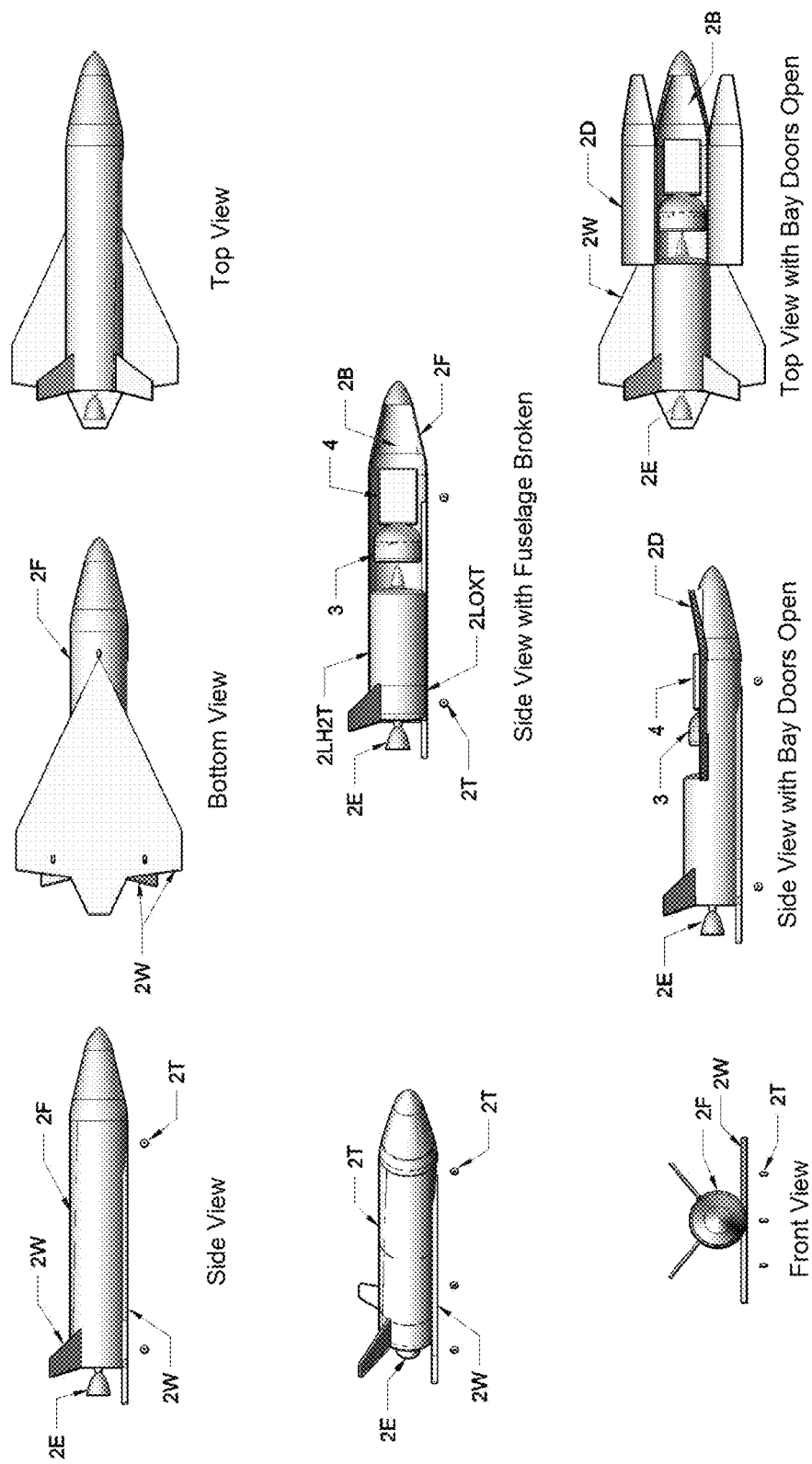
FIG. 4 is a pictorial representation of the SLSS's basic structure and major components in accordance with an exemplary preferred embodiment of the present invention.

FIG. 4 pictorially illustrates the basic structure and major components of SLSS (2) according to the exemplary preferred embodiment of the present invention. The SLSS consists of landing gear (2T), fuselage (2F), wing (2W), cryogenic rocket engine (2E), liquid hydrogen tank (2LH2T), liquid oxygen tank (2LOXT), cargo bay (2B), cargo bay doors (2D). It is used to propel the assembly of upper stage (3) and payload (4) to a predefined velocity and position. As noted above in the summary section, the SLSS (2) structurally could be viewed as a fatted Delta IV's first stage, integrated with wings (2W), landing gears (2T) and fairings (2B). The SLSS (2) is launched from the platform (1) at a predetermined high altitude and recovered by means of conventional horizontal wheel landing. The SLSS (2) burns a combination of liquid oxygen and liquid hydrogen. In the exemplary preferred embodiment, it is preferable to provide means for cross-feeding rocket fuel between the SLSS (2) and the upper stage (3), given that Delta cyrogenic second stage is also fuelled by a combination of liquid oxygen and liquid hydrogen.

Figure 5:
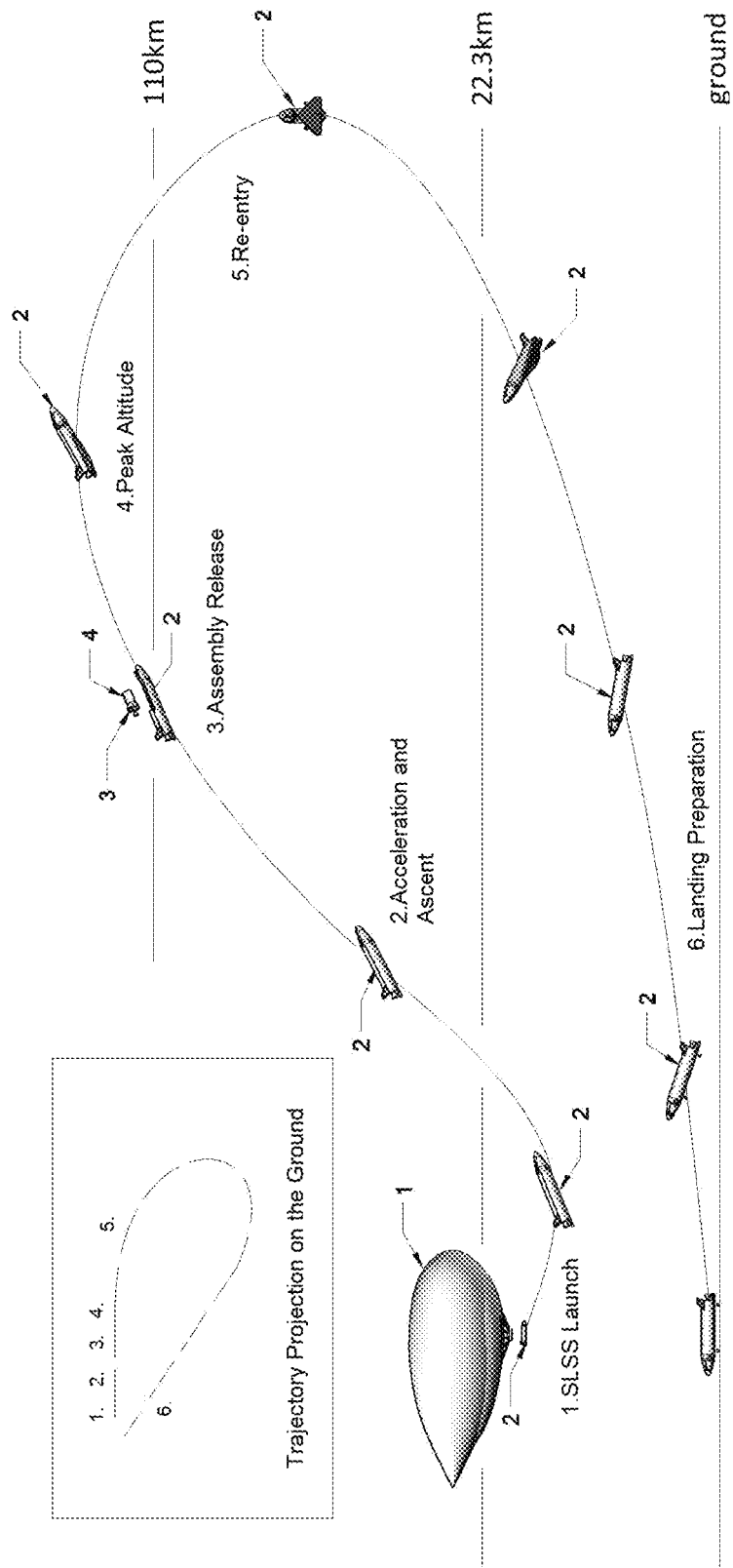
FIG. 5 is a schematic illustration depicting all major steps that the SLSS follows in a typical launch mission, including its recovery, according to an exemplary preferred embodiment of the present invention.

FIG. 5 pictorially shows the flight baseline of SLSS (2) in a typical launch mission according to the exemplary preferred embodiment of the present invention, which is proceeding in a closewise direction. As the launch time arrives, the SLSS (2) is launched from the platform (1). The main engine (2E) shuts down once the SLSS (2) reaches a predetermined velocity and position. Doors (2D) of cargo bay (2B) are opened and its cargo (i.e., the assembly of upper stage (3) and payload (4)) is upwardly released. Subsequently, the doors (2D) are closed and the SLSS (2) adjusts its azimuth and pitch, preparing for its re-entry. The SLSS (2) uses aerodynamic force to decelerate and assist its turn-back. Finally, the SLSS (2) lands on an airfield in ground base via a conventional horizontal wheel landing. The projection of its trajectory on the ground is also schematically plotted in an inset profile in the up-left corner.

According to the exemplary preferred embodiment of the present invention, the re-entry velocity of SLSS (2), 4.9 km/s at 80 km via the calculation of simplified model, is substantially lower than that of space shuttle (8.2 km/s at 80 km). The shuttle's heavy and complicated heat protection systems thus can be greatly simplified. Moreover, the SLSS's mass/(bottom profile area) ratio is lower than space shuttle in re-entry. That further reduces the requirements on heat shielding system. Moreover, the much lower re-entry velocity and mass/ (bottom profile area) ratio increase the probability that the SLSS (2) flies back directly to its original ground base. If that is achieved, the transportation work could be saved and the launch cycle could be shortened.

Figure 6:
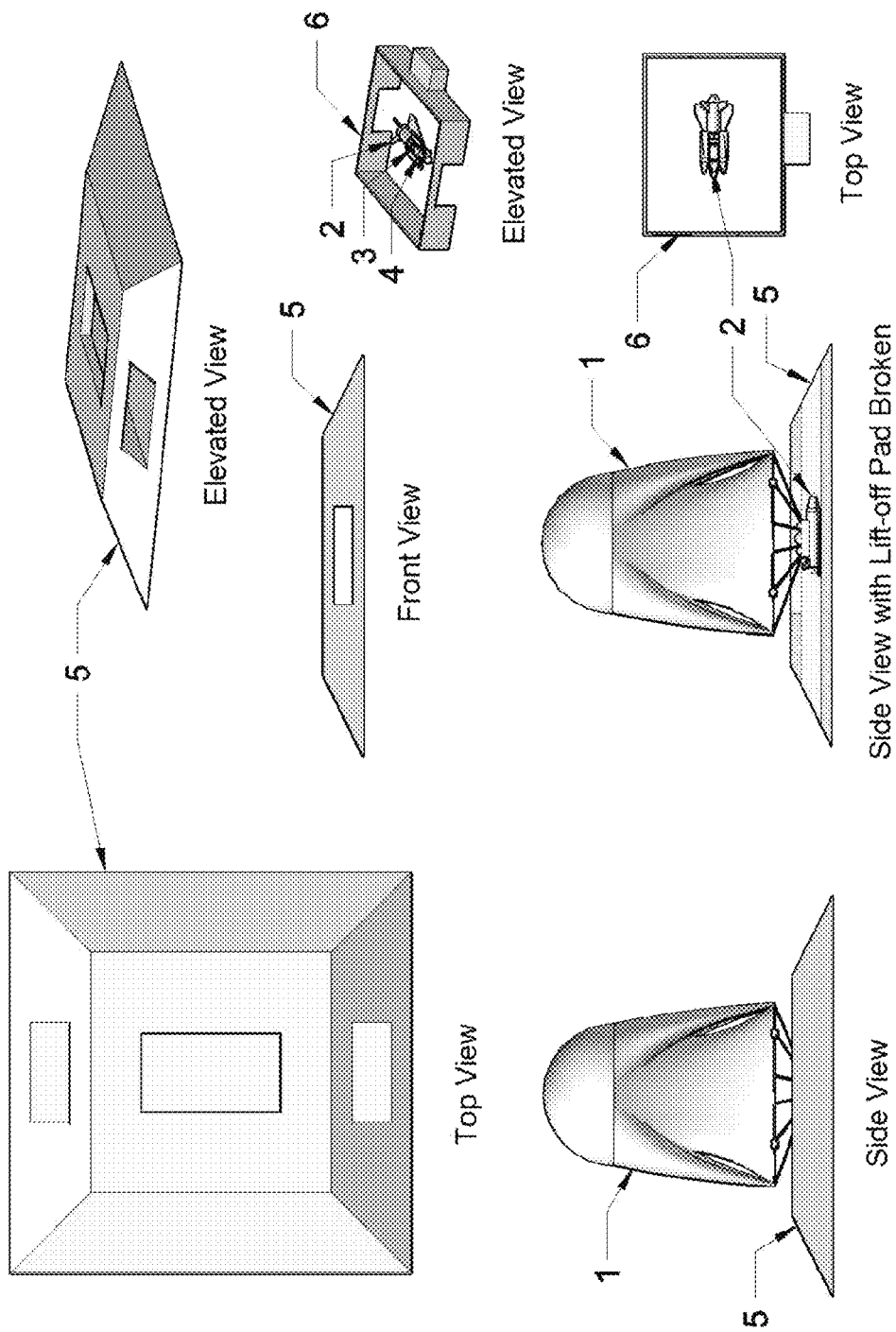
FIG. 6 is a pictorial representation of ground facilities in accordance with an exemplary preferred embodiment of the present invention.

FIG. 6 shows two ground facilities in ground base, the lift-off pad (5) and the assembly loading plant (6), in accordance with the exemplary preferred embodiment of the present invention. The lift-off pad is used to releasably fasten the platform (1), mount the SLSS (2) beneath the service module (1M), fuel the platform (1) and the SLSS (2), inflate lifting gas and lift off the platform (1). The assembly loading plant (6) is used to conduct routine maintenance for the SLSS, and load the assembly into SLSS's cargo bay (2B).

Figure 7:
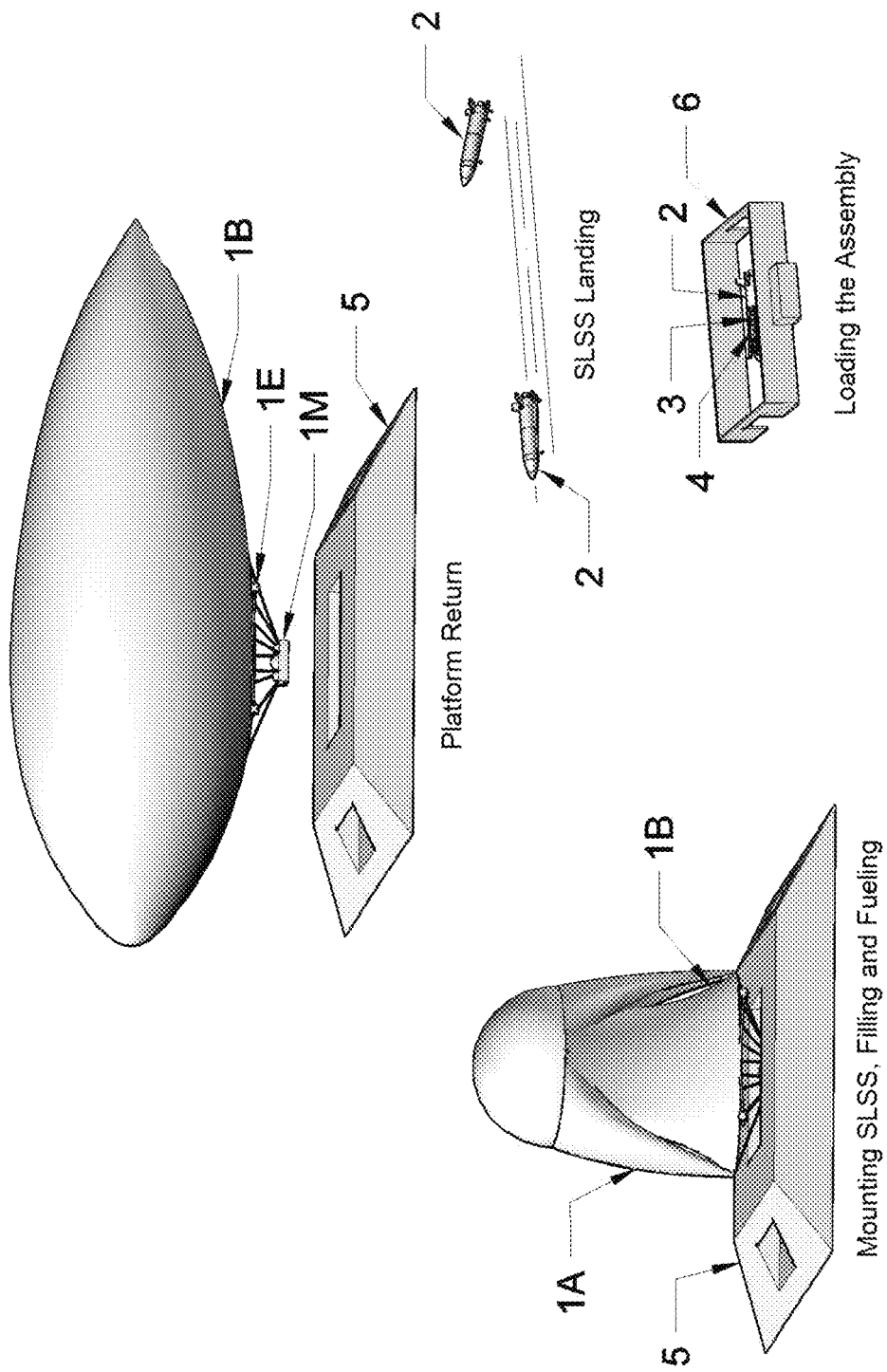
FIG. 7 is a schematic illustration depicting the launch preparing procedures following the last mission, according to an exemplary preferred embodiment of the present invention.

FIG. 7 is a schematic illustration depicting the launch Preparing procedures following the last mission. After the SLSS (2) landed, it is towed to the assembly loading plant (6) by a conventional ground vehicle. After routine maintenance, it is loaded with its cargo. Subsequently, the SLSS (2) will be towed to the lift-off pad (5). Meanwhile, the returned platform (1) is releasably fastened on the lift-off pad (5). The air inside of the air ballonet (1C) is completely vented and a portion of helium is pressured into the helium tank (1HeT) with the assistance of ground facilities. Subsequently, the SLSS (2) is releasably mounted beneath the service module (1M), and its landing gears are retracted. After these procedures conducted, nitrogen gas is released to create an inert environment for fuelling and hydrogen lifting gas inflating.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the invention as defined by the following claims.

What is claimed:

1. A stratospheric-airship-assisted orbital payload launching system comprising:
   A. an airship-based stratospheric launch platform that employs both hydrogen and helium to provide aerostatic lifting force in its ascent and high-alitude cruise stages, vents hydrogen lifting gas after it launches rocket/vehicle, folds hydrogen ballonet on the helium ballonet surface and flies back to ground base;
   B. a stratospheric-launched suborbital shuttle (SLSS) that is launched from said platform, burns cryogenic fuel, propels its cargo (an assembly of upper stage and payload) to an altitude above 80 km, and a speed lower than the orbit speed, releases its cargo, re-enters atmosphere and recovers via a conventional wheel landing;
   C. an upper stage that is either a modified version of conventional upper stage or a newly developed spaceplane, and is released from said SLSS.

2. A system as described in claim 1, in which said airship-based stratospheric launch platform includes hydrogen ballonet, helium ballonet, air ballonet, composite frame, hydrogen-fuelled engines, a suspension system, and a service module that is equipped with liquid nitrogen tank, liquid hydrogen tank and pressured helium tank.

3. A system as described in claim 2, in which said suspension system is used to hang said service module and assist the pitch adjustment of said launch platform via altering the length of tether cables and hence the relative position of the center of mass.

4. A system as described in claim 2, in which said service module is used to releasably fasten said stratospheric-launched suborbital shuttle, uses its onboard liquid hydrogen to compensate the liquid hydrogen loss in fuel tanks of said SLSS and said upper stage, and vaporizes its onboard liquid nitrogen to cool down the liquid oxygen in said SLSS and said upper stage; vaporized liquid hydrogen is harvested to either fuel said hydrogen-fuelled engines of said launch platform, or compensate the lifting gas loss in said hydrogen ballonet; Vaporized liquid nitrogen is harvested to either create inert atmosphere for some key components, or assist removal of hydrogen residue from said hydrogen ballonet after hydrogen lifting gas is vented.

5. A system as described in claim 1, in which said stratospheric-launched suborbital shuttle includes landing gear, fuselage, wing, stabilizer, cryogenic rocket engine, liquid hydrogen tank, liquid oxygen tank, cargo bay, cargo bay doors.

6. A method of launching a payload into space orbit, according to claim 1, comprising steps of: lifting said launch platform to a predetermined position in stratosphere; launching said SLSS from said launch platform; propelling the assembly of said upper stage and payload to a suborbital speed and an altitude above 80 km, by said SLSS; releasing the assembly from said SLSS; launching the payload into a predetermined space orbit by said upper stage; recovering said launch platform; recovering said SLSS via a conventional wheel landing.

7. A method of operating said airship-based stratospheric launch platform in a launch mission according to claim 6, comprising steps of: filling liquid nitrogen into said liquid nitrogen tank, venting air in air ballonet and pressuring helium into said helium tank; fuelling liquid hydrogen into said liquid hydrogen tank and inflating hydrogen gas into said hydrogen ballonet; lifting off and ascending; unfastening the head and tail of said hydrogen ballonet from said composite frame at a predefined altitude; starting said hydrogen-fuelled engines to propel, steer and power said launch platform; launching said SLSS at predetermined position, azimuth, pitch, and time; shutting down engines; venting hydrogen lifting gas at high altitude; descending; folding said hydrogen ballonet on said helium ballonet surface; restarting engines; inflating helium and air into said helium ballonet and said air ballonet respectively; returning to ground base.

8. A method of inflating hydrogen lifting gas according to claim 7, comprising steps of: creating a local inert environment by releasing nitrogen gas; inflating hydrogen gas from the tail of said hydrogen ballonet; clamping the tail of said hydrogen ballonet; releasably fastening the tail of said hydrogen ballonet on said composite frame.

9. A method of minimizing cross-sectional area in initial ascent stage according to claim 7 via releasably fastening the head and tail of said hydrogen ballonet on said composite frame.

10. A method according to claim 7, wherein redundant hydrogen is inflated into said hydrogen ballonet to provide extra buoyancy that speeds up the ascent of said launch platform, and is then harvested to fuel said hydrogen-fuelled engines to bring said launch platform to a predetermined launch position when said hydrogen-fuelled engines start.

11. A method of venting hydrogen lifting gas according to claim 7, comprising steps of: shutting down said hydrogen-fuelled engines and adjusting the pitch of said launch platform by means of altering length of tether cables in said suspension system as soon as said SLSS is launched; loosening clamp ring on the tail of said hydrogen ballonet to vent hydrogen at high altitude; inflating nitrogen to assist the removal of hydrogen residue.

12. A method of operating said stratospheric-launched sub-orbital shuttle in a launch mission according to claim 6, comprising steps of: igniting said cryogenic rocket engine and separating from said service module of said launch platform; rocketing to a predetermined velocity and altitude; opening cargo bay doors; releasing the assembly; closing cargo bay doors; re-entering the atmosphere; making a U-turn and gliding to an airfield; recovering via a conventional wheel landing.

13. A method of boosting reliability of said orbital payload launching system according to claim 6, comprising: said SLSS
owning the capability to glide to an airfield with its cargo and make a conventional wheel landing; said airship-based stratospheric launch platform
providing altitude redundancy for said SLSS; said airship-based stratospheric launch platform
owning large buoyancy reserve via vaporizing liquid hydrogen or inflating helium from said pressured helium tank into corresponding ballonets; said helium ballonet providing a buffering protection for said SLSS in case said hydrogen ballonet accidentally explodes.

14. A method of boosting safety in the system of claim 1, comprising: shutting down said hydrogen-fuelled engines and most of electronic devices on said launch platform in initial ascent stage until said platform reaches a predefined altitude; using hydrogen as lifting gas only in ascent and high-altitude cruise stages; venting the hydrogen lifting gas at high altitude as soon as said SLSS is launched; employing nitrogen gas to assist the removal of hydrogen residue in said hydrogen ballonet after the hydrogen lifting gas is vented; using helium as the only lifting gas to provide buoyancy for said launch platform's descent and return; employing helium ballonet as an isolation layer between said hydrogen ballonet and the region that positions said hydrogen-fuelled engines, said service module and said SLSS; including conductive materials in fabric structures of said launch platform to prevent and remove static charge; releasing a large amount of inert gas to create an inert environment for fuelling and hydrogen inflating.

* * * * *